(12) United States Patent
Varekamp

(10) Patent No.: US 11,783,527 B2
(45) Date of Patent: Oct. 10, 2023

(54) APPARATUS AND METHOD FOR GENERATING A LIGHT INTENSITY IMAGE

(71) Applicant: KONINKLIJKE PHILIPS N.V., Eindhoven (NL)

(72) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 109 days.

(21) Appl. No.: 17/430,345

(22) PCT Filed: Feb. 10, 2020

(86) PCT No.: PCT/EP2020/053281
§ 371 (c)(1),
(2) Date: Aug. 12, 2021

(87) PCT Pub. No.: WO2020/165076
PCT Pub. Date: Aug. 20, 2020

(65) Prior Publication Data
US 2022/0139023 A1 May 5, 2022

(30) Foreign Application Priority Data
Feb. 15, 2019 (EP) ..................................... 19157331

(51) Int. Cl.
*G06T 15/04* (2011.01)
*G06T 15/20* (2011.01)
(Continued)

(52) U.S. Cl.
CPC .............. *G06T 15/04* (2013.01); *G06T 7/529* (2017.01); *G06T 15/205* (2013.01); *G06T 15/50* (2013.01)

(58) Field of Classification Search
None
See application file for complete search history.

(56) References Cited

U.S. PATENT DOCUMENTS

| 6,734,861 B1* | 5/2004 | Van Dyke | G06T 15/005 |
| | | | 345/506 |
| 8,698,832 B1* | 4/2014 | Lewis | G06T 5/003 |
| | | | 382/172 |

(Continued)

FOREIGN PATENT DOCUMENTS

| EP | 3358844 A1 | 8/2018 |
| WO | 2018104102 A1 | 6/2018 |

OTHER PUBLICATIONS

C.L. Zitnick "High Quality Video View Interpolation Using a Layered Representation" SIGGRAPH 04 ACM SIGGRAPH 2004 p. 600-608.

(Continued)

*Primary Examiner* — Anh-Tuan V Nguyen

(57) ABSTRACT

An apparatus comprises receivers (201, 203) receiving texture maps and meshes representing a scene from a first and second view point. An image generator (205) determines a light intensity image for a third view point based on the received data. A first view transformer (207) determines first image positions and depth values in the image for vertices of the first mesh and a second view transformer (209) determines second image positions and depth values for vertices of the second mesh. A first shader (211) determines a first light intensity value and a first depth value based on the first image positions and depth value, and a second shader (213) determines a second light intensity value and a second depth value from the second image positions depth values. A combiner (215) generates an output value as a weighted combination of the first and second light intensity values where the weighting of a light intensity value increases for an increasing depth value.

20 Claims, 5 Drawing Sheets

(51) Int. Cl.
    *G06T 15/50*    (2011.01)
    *G06T 7/529*    (2017.01)

(56) References Cited

U.S. PATENT DOCUMENTS

| | | | |
|---|---|---|---|
| 10,325,402 B1 * | 6/2019 | Wang | G06T 15/503 |
| 10,699,466 B2 | 6/2020 | Varekamp | |
| 2003/0228052 A1 * | 12/2003 | Yamaguchi | G06T 11/001 |
| | | | 382/154 |
| 2006/0028489 A1 | 2/2006 | Uyttendaele et al. | |
| 2010/0194856 A1 * | 8/2010 | Varekamp | H04N 13/261 |
| | | | 348/42 |
| 2010/0329358 A1 * | 12/2010 | Zhang | H04N 19/187 |
| | | | 375/E7.02 |
| 2013/0016114 A1 * | 1/2013 | Rabii | G09G 5/363 |
| | | | 345/589 |
| 2015/0043636 A1 * | 2/2015 | Jung | H04N 19/59 |
| | | | 375/240.12 |
| 2016/0063715 A1 * | 3/2016 | Wan | G06T 3/40 |
| | | | 382/195 |
| 2019/0057513 A1 * | 2/2019 | Jain | G06T 7/194 |
| 2020/0162714 A1 * | 5/2020 | Kwak | H04N 13/111 |

OTHER PUBLICATIONS

Gaurav "Depth Synthesis and Local Warps for Plausible Image-Based Navigation" ACM Transactions on Graphics ACM vol. 32, No. 3 Jul. 4, 2013 p. 1-12.

Z-Buffering—Wikipedia Downloaded Jul. 29, 2021.

International Search Report and Written Opinion From PCT/EP2020/053281 dated Aug. 20, 2020.

* cited by examiner a b c

APPARATUS AND METHOD FOR GENERATING A LIGHT INTENSITY IMAGE

CROSS-REFERENCE TO PRIOR APPLICATIONS

This application is the U.S. National Phase application under 35 U.S.C. § 371 of International Application No. PCT/EP2020/053281, filed on Feb. 10, 2020, which claims the benefit of EP Patent Application No. EP 19157331.0, filed on Feb. 15, 2019. These applications are hereby incorporated by reference herein.

FIELD OF THE INVENTION

The invention relates to an apparatus and method for generating a light intensity image, and in particular to generating a light intensity image for a new view point based on texture maps and meshes from a plurality of different view points suitable for accelerated hardware processing.

BACKGROUND OF THE INVENTION

Graphic applications based on three-dimensional scenes have become prevalent in many applications such as specifically computer graphic applications. In order to support fast three-dimensional graphics processing, a number of standards and specifications have been developed. This not only provides faster design and implementation as it may provide standardized functions and routines for many standard operations, such as view point shifting, but also allows for dedicated hardware graphic engines to be developed and optimized for these routines. Indeed, for many computers, the Graphic Processing Unit (GPU) may nowadays often be at least as powerful and important as the Central Processing Unit (CPU).

An example of a standard for supporting fast graphics processing is the OpenGL specification which provides an Application Programming Interface (API) with a number of functions supporting graphics processing. The specification is typically used to provide hardware accelerated graphics processing with the specific routines being implemented by dedicated accelerated hardware in the form of a GPU.

In most such graphic specifications, the representation of the scene is by a combination of multiple texture maps with associated three-dimensional meshes. Indeed, a particularly effective approach in many scenarios is to represent image objects, or indeed the scene as a whole, by a polygon mesh where a set of polygons are connected by their common edges or corners (vertices), which are given by three-dimensional positions. The combined three-dimensional polygon mesh accordingly provides an effective model of three-dimensional objects, including possibly a three-dimensional description of an entire image. The polygon mesh is often a triangle mesh formed by triangles having common corners given in 3D space.

As an example, a stereo camera may record an image of a scene from a given view point. For each pixel, a disparity estimation may be performed to estimate the distance to the object represented by the pixel. This may be performed for each pixel thereby providing a three-dimensional position of x,y,z for each pixel. These positions may then be used as vertices for a triangle (or other primitive) mesh with two triangles being formed for each group of 2×2 pixels. As this may result in a large number of triangles, the process may include combining some initial triangles into larger triangles (or in some scenarios more generally into larger polygons). This will reduce the number of triangles but also decrease the spatial resolution of the mesh. Accordingly, it is typically dependent on the depth variations and predominantly done in flatter areas.

Each vertex is further associated with a light intensity value of the texture map. The texture map essentially provides the light/color intensity in the scene for the object at the pixel position for the vertex. Typically, a light intensity image/texture map is provided together with the mesh with each vertex containing data representing the x, y, z position of the vertex and u,v data identifying a linked position in the texture map, i.e. it points to the light intensity at the x, y, z position as captured in the texture map.

In such representations, the polygon mesh is used to provide information of the three-dimensional geometry of the objects whereas the texture is typically provided as a separate data structure. Specifically, the texture is often provided as a separate two-dimensional map which by the processing algorithm can be overlaid on the three-dimensional geometry.

The use of triangle meshes is particularly suitable for processing and manipulation by computer graphics algorithms, and many efficient software and hardware solutions have been developed and are available in the market. A substantial computational efficiency is in many of the systems achieved by the algorithm processing the individual vertices commonly for a plurality of polygons rather than processing each polygon separately. For example, for a typical triangle mesh, the individual vertex is often common to several (often 3-8) triangles. The processing of a single vertex may accordingly be applicable to a relatively high number of triangles thereby substantially reducing the number of points in an image or other object that is being processed.

As a specific example, many current Systems on Chip (SoCs) contain a GPU which is highly optimized for processing of 3D graphics. For instance, the processing of 3D object geometry and 3D object texture is done using two largely separate paths in the so called OpenGL rendering pipeline (or in many other APIs such as DirectX). The hardware of GPUs on SoCs can deal efficiently with 3D graphics as long as the 3D source is presented to the GPU in the form of vertices (typically of triangles) and textures. The OpenGL application interface then allows setting and control of a virtual perspective camera that determines how 3D objects appear as projected on the 2D screen. Although OpenGL uses 3D objects as input, the output is typically a 2D image suitable for a normal 2D display.

However, such approaches require the three-dimensional information to be provided by a polygon mesh and associated texture information. Whereas this may be relatively easy to provide in some applications, such as e.g. games based on fully computer generated virtual scenes and environments, it may be less easy in other embodiments. In particular, in applications that are based on capturing real scenes, it requires that these are converted into a texture and mesh representation. This may, as previously mentioned, be based on stereo images or on an image and depth representation of the scene. However, although a number of approaches for performing such a conversion are known, it is not trivial and poses a number of complex problems and challenges.

A common operation in graphics processing is view point changes where an image is generated for a different view point than that of the input texture map and mesh. Graphic APIs typically have functions for very efficiently performing such view point transformations. However, as the input mesh typically is not perfect, such view point transformations may result in quality degradation of the shift is too significant. Further, a representation of a scene from a view point will typically include a number of occluded elements where a foreground object occludes elements behind it. These elements may be visible from the new direction, i.e. the view point change may result in de-occlusion. However, for estimated depth, the input texture map and mesh will in such a case not comprise any information for these de-occluded parts. Accordingly, they cannot be optimally represented as the required information is not available.

For these reasons, view point transformation is often based on a plurality of texture maps and meshes corresponding to different view directions. Indeed, in order to synthesize a new (unseen) view point, it is typically preferred or even necessary to combine multiple captured meshes with associated camera images (textures) from the different view-points. The main reason for combining data from different view-points is to recover objects that are hidden (occluded) in one view but visible in another view. This problem is often referred to as view-point interpolation.

However, conventional approaches for this still tend to be suboptimal.

For example, one approach for generating a new viewpoint is to transform the meshes originating from the different view-points to a single world coordinate system and then perform a perspective projection onto a new camera plane. These steps can be done in standard graphics hardware. However, this will typically not correctly show hidden surfaces. Specifically, graphics hardware uses depth testing to select the front-most point when points are combined at a single pixel. This approach is used to address self-occlusion where the view point shifting may result in image objects moving relative to each other such that new occlusions occur, i.e. at the new view point there may be an occlusion for two points that are not occluded from the original view point. However, when applied to different images this may result in errors or degradations. Indeed, the depth is typically linearly interpolated such that it extends beyond foreground objects (like a halo effect), the front-most point will often correspond to areas that may be occluded due being next to a foreground object.

An example for a technique for view-interpolation based on depth images is provided in C. L. Zitnick et. al. "High-quality video view interpolation using a layered representation". SIGGRAPH '04 ACM SIGGRAPH 2004, pp. 600-608. To achieve high quality, the technique uses a two-layer representation consisting of a main layer and a boundary layer (around depth transitions). These are constructed using alpha matting (accounting for transparency) and both are warped (and mixed with other views) during the render process. A drawback of this approach is the need to disconnect the mesh to generate the two-layer representation. This process needs to select a threshold for the depth map and erase triangles of the corresponding mesh at depth discontinues. This is not desirable since using thresholds can potentially decrease temporal stability in the rendering.

An example of a specific approach for view-interpolation based on mesh and texture map representations is provided in WO2018104102A1. The approach is based on combining light intensity information from different view points based on gradients in the corresponding meshes. However, whereas the approach may provide advantageous performance in many embodiments, it tends to not be optimal in all scenarios and furthermore tends to require relatively complex operations and has a relatively high computational resource.

Hence, an improved approach for generating images for a different view point would be advantageous and in particular an approach that allows increased flexibility, increased accuracy, reduced complexity, improved computational efficiency, improved compatibility with existing graphic processing approaches, improved image quality, improved de-occlusion performance, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a method of generating a light intensity image, the method comprising: receiving a first texture map and a first mesh representing a scene from a first view point; receiving a second texture map and a second mesh representing the scene from a second view point; determining the light intensity image representing the scene from a third view point in response to the first texture map, the first mesh, the second texture map, and the second mesh; wherein determining the light intensity image comprises: determining corresponding first image positions in the light intensity image and first image position depth values for vertices of the first mesh; determining corresponding second image positions in the light intensity image and second image position depth values for vertices of the second mesh; and for each first position of a plurality of positions in the light intensity image: determining a first light intensity value based on the first texture map and the first image positions, and a first depth value based on the first image positions and the first image position depth values; determining a second light intensity value based on the second texture map and the second image positions, and a second depth value based on the second image positions and the second image position depth values; determining a light intensity value for the light intensity image at the first position as weighted combination of at least the first light intensity value and the second light intensity value; a weighting of the first light intensity value relative to the second light intensity value increasing for an increasing first depth value.

The invention may in many embodiments provide improved generation of a light intensity image for a given view point based on texture maps and meshes from other view points. In many scenarios, improved representation of areas that are de-occluded with respect to one of the input view points, but not the other, is achieved. The approach may in particular in many embodiments provide improved quality around edges of foreground objects.

The approach may avoid the generation of mesh holes known from other approaches and may provide improved depth consistency.

A particular advantage of the approach is that it may in many embodiments be closely supported by standard graphic routines. Many of the individual operations may in many embodiments be performed by standardized, dedicated, and optimized graphic processing hardware. For example, the approach may be compatible with standardized graphic processes and may utilize these efficiently. Indeed, the approach may be compatible with such standardized approaches, such as e.g. the OpenGL specification, by limiting non-standard approaches to parts of the rendering/processing pipeline which allows user adaptation. E.g. the determination of first and second light intensity value and/or the combination may be performed as part of the fragment shader stage of e.g. an OpenGL rendering pipeline. The determination of the first/second image positions and corresponding depth values may be performed by a vertex shader, e.g. of an OpenGL rendering pipeline.

Further, the approach does not require any dedicated determination and warping/view point shifting of specific values such as depth gradients and may therefore be suitable for implementations that have limited computational resource. The approach may for example be particularly suitable for implementation in portable devices, such as e.g. smart phones.

The possibility of using standardized hardware accelerated processing for resource intensive elements of the processing may substantially increase e.g. the speed or capacity of the system. It may reduce the complexity and or resource requirements in many embodiments.

In some embodiments, the combination may include additional light intensity values derived from texture maps and meshes for other view points.

A mesh may be a three dimensional mesh wherein each vertex is associated with (has) a three dimensional position. Each vertex may specifically be represented by at least a three dimensional spatial position x, y, z. Each vertex of a mesh may further be linked with a position in the corresponding texture map. For example, for each vertex, a position u,v in the texture map corresponding to the spatial position x, y, z may be stored.

A mesh may include information relating to the depths of the represented objects but is not limited thereto (e.g. as described, vertices may be represented by three dimensional coordinates rather than merely by a depth coordinate).

Depth may e.g. be represented by a disparity, e.g. a depth map may be an indication of a disparity map. A higher depth value indicates a further distance from a reference view point, and thus indicates a depth further away from the viewpoint and further towards the background.

Increasing the weighting of the first light intensity value relative to the second light intensity value for an increasing first depth value may be achieved by determining the weight for the first light intensity value as a monotonically increasing function of the first depth value and/or determining the weight for the second light intensity value as a monotonically decreasing function of the first depth value.

In many embodiments, the first and second texture maps and the first and second meshes are generated from captures of a real-life scene.

The approach may allow a high performance and efficient determination of images for new view points for a capture of a real-life scene and is not limited to e.g. images provided by virtual reality graphic engines.

In accordance with an optional feature of the invention, the weighting is dependent on a sign of a difference between the first depth value and the second depth value.

This may provide a particularly efficient implementation and/or high performance and may in particular in many scenarios bias the combination towards light intensity values that represent non-occluded rather than occluded values in the input texture maps.

The sign of the difference may indicate whether the first depth value is larger than the second depth value or whether the second depth value is larger than the first depth value. It may be independent of how big the difference is.

In accordance with an optional feature of the invention, the weighting is dependent on a magnitude of a difference measure between the first depth value and the second depth value.

This may provide a particularly efficient implementation and/or high performance. The magnitude of the difference may indicate how large the difference between the first and second depth values is but not which is the largest. The magnitude may be an absolute value.

In accordance with an optional feature of the invention, there is provided the weighting for a largest depth value of the first depth value and the second depth value relative to a lowest depth value of the first depth value and the second depth value increases for an increasing magnitude of the difference measure.

This may provide a particularly efficient implementation with high performance in many embodiments.

In accordance with an optional feature of the invention, determining the light intensity value for the light intensity image comprises setting the light intensity value to a value of the first light intensity value and the second light intensity value corresponding to a highest depth value.

This may provide a particularly efficient implementation with high performance in many embodiments.

In accordance with an optional feature of the invention, determining corresponding first image positions in the light intensity image and first image position depth values for vertices of the first mesh is performed by a vertex shader.

This may provide a particularly efficient implementation with high performance in many embodiments. It may provide a particularly efficient operation and may reduce resource requirements and/or increase processing speed substantially. In particular, it may in many embodiments allow standardized hardware acceleration to be used for resource critical elements of the process.

The approach may allow extremely efficient and low complexity operation where the same optimized functionality (such as e.g. a GPU) can be reused for resource critical elements of the processing.

In accordance with an optional feature of the invention, the step of determining the first light intensity value is performed by a first fragment shader.

This may provide a particularly efficient implementation with high performance in many embodiments. It may provide a particularly efficient operation and may reduce resource requirements and/or increase processing speed substantially. In particular, it may in many embodiments allow standardized hardware acceleration to be used for resource critical elements of the process.

In accordance with an optional feature of the invention, the step of determining the light intensity value for the light intensity image is performed by a second fragment shader.

This may provide a particularly efficient implementation with high performance in many embodiments. It may provide a particularly efficient operation and may reduce resource requirements and/or increase processing speed substantially. In particular, it may in many embodiments allow standardized hardware acceleration to be used for resource critical elements of the process.

In accordance with an optional feature of the invention, the second fragment shader is arranged to receive second shader texture maps comprising multicomponent values including at least one light intensity component value and one transparency component value and to generate an output light intensity value by combining light intensity component values from a plurality of the texture maps in response to the transparency component value; and the method further comprises the step of setting a transparency component value of a multicomponent value comprising the first light intensity value to the first depth value.

The approach may allow extremely efficient and low complexity operation where the same optimized functionality (such as e.g. a GPU) can be reused for resource critical elements of the processing.

The step of setting a transparency component value of a multicomponent value comprising the first light intensity value to the first depth value may be performed prior to the second fragment shader determining the light intensity value for the light intensity image. The first fragment shader may determine the first light intensity value and the first depth value. The image generator may then generate texture maps comprising multicomponent values where the multicomponent values are set to comprise at least the first light intensity value and the first depth value where the first depth value is comprised in a transparency component field/parameter/value of the multicomponent values. The second fragment shader may then process the texture maps to generate an output light intensity value by combining light intensity component values from a plurality of the texture maps in response to the transparency component values (which in this case are the first depth values determined by the first fragment shader).

In accordance with an optional feature of the invention, the weighted combination further includes a third light intensity value generated from a third mesh and a third texture map.

The approach is highly suited for generating light intensity images based on more input mesh images for different viewpoints (or indeed for multiple mesh images from the same viewpoint)

In accordance with an optional feature of the invention, the weighting of the first light intensity value relative to the second light intensity value is dependent on first light intensity values in a first neighborhood around the first light intensity value and second light intensity values in a second neighborhood around the second light intensity value.

This may improve performance in many embodiments.

The first neighborhood may comprise light intensity values generated from the first texture map and the first mesh and the second neighborhood may comprise light intensity values generated from the second texture map and second first mesh.

In accordance with an optional feature of the invention, the weighting is further dependent on a difference between the first view point and the third view point.

This may improve performance in many embodiments.

In accordance with an optional feature of the invention, the weighting of the first light intensity value relative to the second light intensity value is further dependent on a reliability indication being indicative of a reliability of a depth estimation used to determine a depth at the first mesh position, in the first depth map, the weighting of the first light intensity value relative to the second light intensity value increasing for the reliability indication being indicative of an increasing reliability of the depth estimation.

This may improve performance in many embodiments.

According to an aspect of the invention there is provided an apparatus for generating a light intensity image, the apparatus comprising: a receiver for receiving a first texture map and a first mesh representing a scene from a first view point; a receiver for receiving a second texture map and a second mesh representing the scene from a second view point; an image generator for generating a light intensity image representing the scene from a third view point in response to the first texture map, the first mesh, the second texture map, and the second mesh; wherein the image generator comprises: a first view transformer for determining a first light intensity value for a first position in the light intensity image by a view point transformation based on the first texture map and the first mesh; a second view transformer for determining a second light intensity value for the first position by a view point transformation based on the second texture map and the second mesh; a combiner for determining a light intensity value for the light intensity image at the first position by a weighted combination of the first light intensity value and the second light intensity value; a weighting of the weighted combination being dependent a first depth gradient in the first mesh at a first mesh position corresponding to the first position relative to a second depth gradient in the second mesh at a second mesh position corresponding to the first position.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a rendering of a two-dimensional image based on texture maps and meshes generated from capturing a real life three-dimensional scene from different view points (i.e. different camera views). However, it will be appreciated that the invention is not limited to this application but may be applied to e.g. generation of images based on computer generated depth maps and meshes for a virtual reality scene.

Many 3D image (including video) processing algorithms and processes are based on the use of triangle meshes as this may provide high computational efficiency in many embodiments. Meshes providing three-dimensional information together with an associated texture map is widely used in many graphic processing systems, such as specifically in computer graphics. A mesh may provide information of the geometric structure which includes depth information (but is of course not limited to only provide depth information, e.g. it may typically provide a three-dimensional coordinate for each vertex). For brevity, the combination of a mesh and its associated texture map will in the following also be referred to as a mesh image.

Mesh image based graphics processing and image generation is ubiquitous and most computer graphics cards, mobile phones, game consoles etc. are based on or support one or more mesh based graphics handling approaches. A number of standards have been developed providing cross-platform application programming interfaces that can be used by applications to efficiently utilize e.g. dedicated hardware based graphics processing. Such approaches include the well-known OpenGL or DirectX application programming interfaces that are widely supported, including by highly specialized and optimized hardware.

Mesh image based processing is very suitable for flexibly modifying view directions when rendering the scene, and is particularly suitable for scenarios in which the view point is not restricted to movements in a strict horizontal line but rather a free movement of the view point is desired. An efficient way to generate a new view-point is to transform the meshes originating from the different view-points to a single world coordinate system and then perform a perspective projection onto a new camera plane. These steps can be done very efficiently using standard optimized graphics hardware, such as hardware based on the OpenGL standard. However, in order to optimize quality and provide additional information for areas which are being de-occluded by the view point transformations, the generation of a rendering image from a new view point is preferably based on texture maps and meshes provided for a plurality of different view points.

The Inventor has realized that this may often lead to sub-optimum results with artefacts and specifically to depth distortions and incorrect filling in of de-occluded areas.

Figure 1:
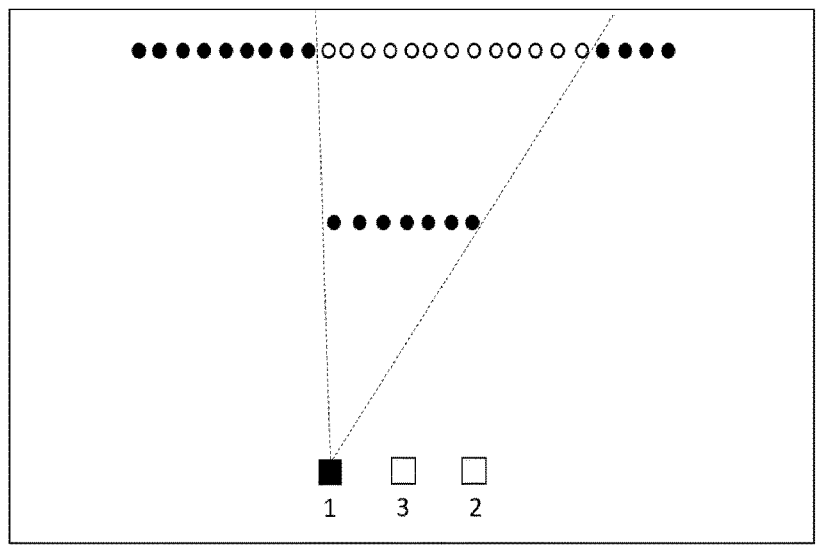
FIG. 1 illustrates an example of a view point transformation for a scene with one background object and a foreground object.
Figure 1:
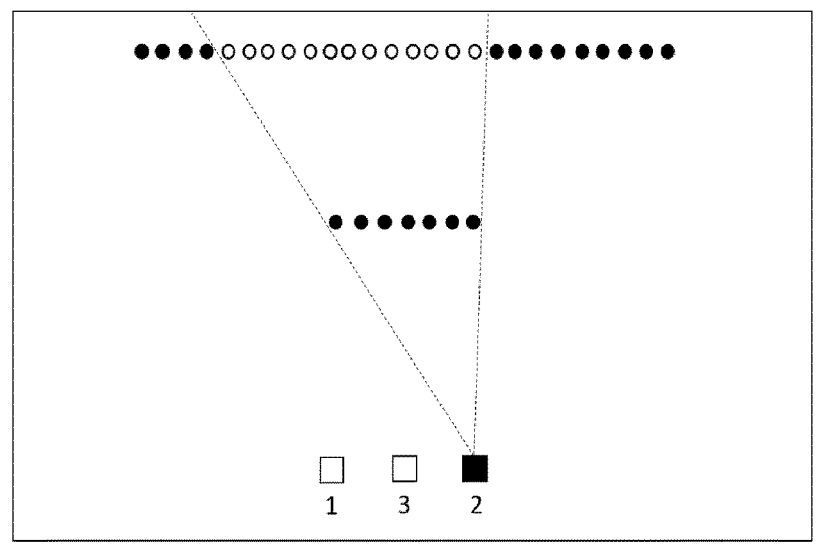
Figure 1:
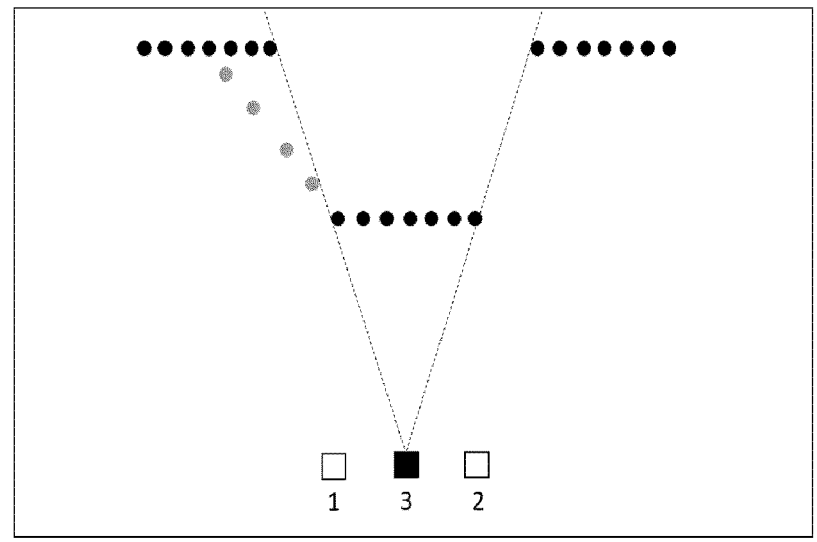

This may be illustrated by FIG. 1 which illustrates an example with one foreground object in front of one background object. In the example, each point/dot can be considered to correspond to a scene position which may be represented by a vertex, and typically a dot may represent a pixel and indeed a vertex of the mesh. FIG. 1 illustrates an example where a mesh image is provided for a first view point 1 and for a second view point 2. Based on these mesh images, a two-dimensional image is generated for a third view point 3 between the first view point 1 and the second view point 2. Thus, in the example, the first and second view points 1,2 correspond to the camera view points when capturing the scene and view point 3 corresponds to the desired view point for the scene. The image is a light intensity image generated for rendering. It may directly reflect a light intensity value for the individual pixels of an image to be rendered/displayed by a display.

It will be appreciated that the light intensity values may be any value indicative of a light intensity, and may specifically be a light intensity for e.g. one color channel. For example, a light intensity value may be an R, G or B value of an RGB representation, or may e.g. be a Y value of a Yuv representation, or may indeed be a u or v value of such a Yuv representation. It is noted that the u and v values may be chroma values and that these also provide information relating to the light intensity of individual color channels when rendering. Thus, a light intensity value may be a luminance, chrominance, or indeed chroma value of a color representation.

In FIG. 1, the first figure illustrates the positions that are visible from view point 1 by block (solid) dots and the positions on the background object that are occluded by the foreground object are illustrated by white (non-solid) dots. The second figure illustrates the corresponding situation from view point 2. Thus, the two first sub-figures show the visibility of scene points for the two different cameras view points 1 and 2.

The third sub-figure illustrates the result of combining meshes and textures from view points 1 and 2 and warping (view point transforming) these into view point 3. The mesh originating from view point 2 will be locally stretched and a gap is formed (corresponding to the de-occlusion of part of the background object). The depth of the gap is linearly interpolated between points with different depth after projection into virtual view-point 3. Thus, effectively, the primitives, and in most embodiments the triangles, that form the mesh at the transition between the background and the foreground in the mesh for view point 2 will be stretched following the view transformation from view point 2 to view point 1.

The grey circles in FIG. 1 represent points that originate from view point 2 and which are interpolated linearly between the known 3D points in the mesh when projecting the scene in the camera coordinates of view point 3. Thus, the grey dots/points indicate depth positions which after the de-occlusion resulting from the view point transformation from view point 2 to view point 3 are generated to correspond to positions in the image from view point 3. These points lie closer to view point 3 than the black points behind them which represent points on the background object visible from view point 1.

However, when generating the image for view point 2, the typical approach is to select the front most position. Thus, rather than ideally selecting the black points originating from, and visible from, view point 1, the system will select the grey points originating from view point 2. Accordingly, the light intensity image value will at these points be generated based on the texture map of view point 2 rather than be based on the texture map of view point 1. This will result in the image for a de-occluded area being determined from the texture map in which the corresponding object was occluded instead of from the texture map in which the object was not occluded. As a result, the quality of the generated image is degraded and typically the elements of the de-occluded area are not accurately presented despite the appropriate information actually being available to the process.

It should be noted that although it is in theory possible to modify the depth test logic as used in the standardized hardware, this can in practice only be done for a given render call. It would therefore be necessary to split the mesh up again in parts with the earlier mentioned disadvantage of using thresholds. The standard depth test is part of the processing to address self-occlusion where the mesh from a separate view-point may fold onto itself (self-occlusion) with the depth test being used to resolve the resulting ambiguities.

Figure 2:
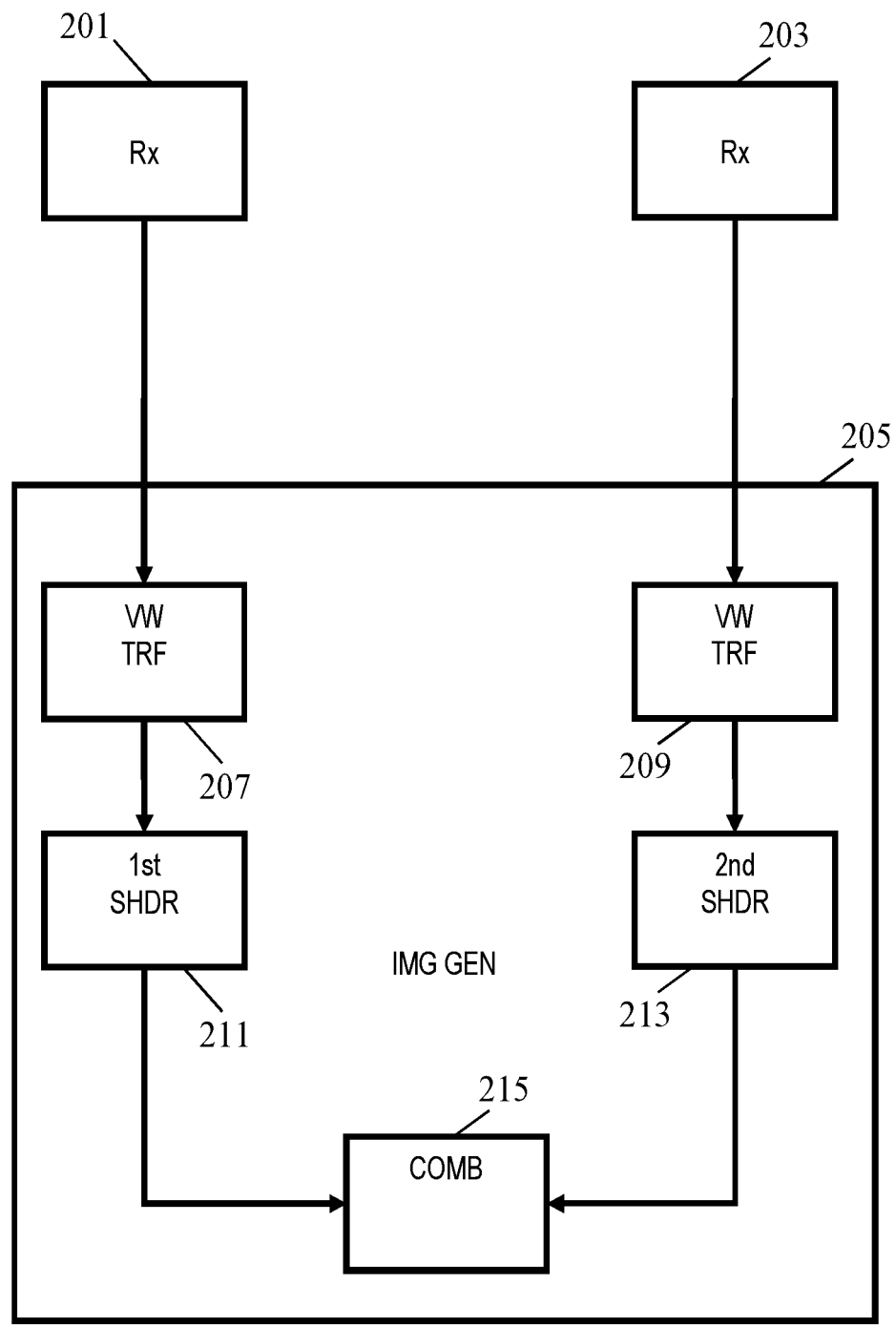
FIG. 2 illustrates an example of elements of an apparatus for generating an image in accordance with some embodiments of the invention.
Figure 3:
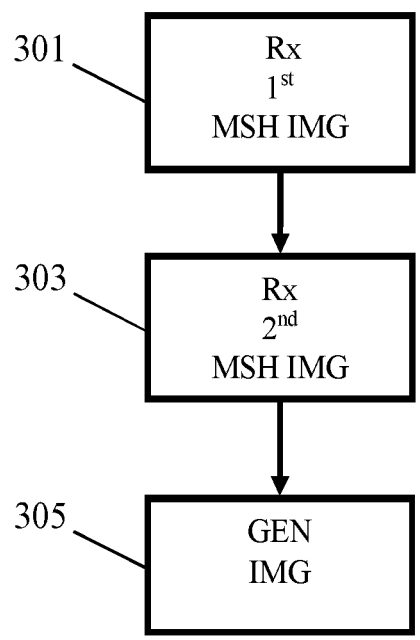
FIG. 3 illustrates an example of elements of a method for generating an image in accordance with some embodiments of the invention.
Figure 4:
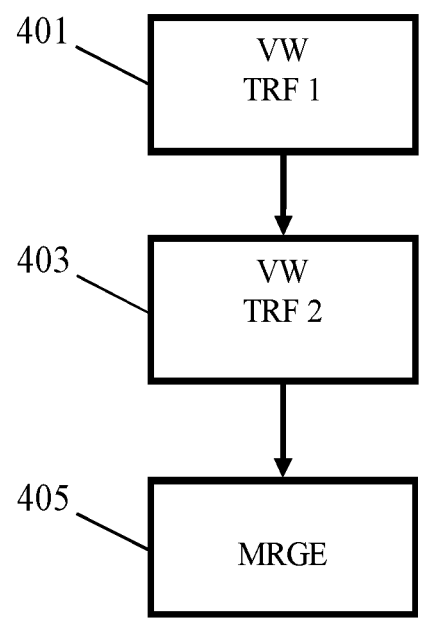
FIG. 4 illustrates an example of elements of a method for generating an image in accordance with some embodiments of the invention.
Figure 5:
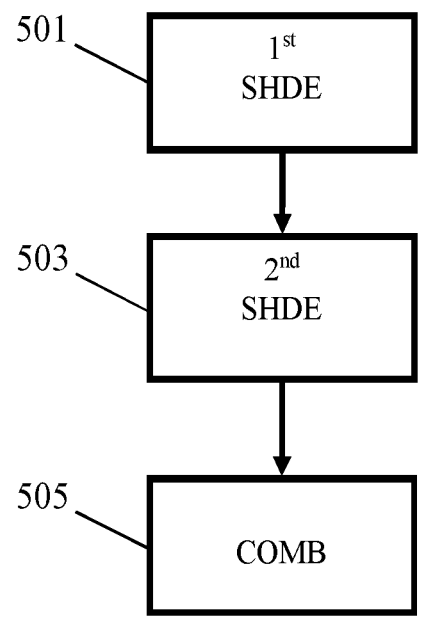
FIG. 5 illustrates an example of elements of a method for generating a light intensity value for an image in accordance with some embodiments of the invention.

In the following, an apparatus and method for generating a light intensity image from a plurality of meshes and associated texture maps for different view points will be described with reference to FIG. 2 which illustrates some exemplary elements of such an apparatus, and to FIGS. 3-5 which illustrate some exemplary elements of such a method.

The approach of the apparatus and method of FIGS. 2 and 3-5 seeks to mitigate some of the described disadvantages. Specifically, rather than always selecting the foremost point, the system is arranged to generate the light intensity value for a given position in the output image based on a weighted combination of the light intensity values of both texture maps (for the different view points) for that position where the weighting is dependent on depth values, and often the difference between the depth values for that position. The weighting may be such that a weighting of a light intensity value increases the further towards the back the corresponding point is. Thus, the weighting for a light intensity value may increase with the depth.

The apparatus comprises a first receiver 201 which performs step 301 wherein a first mesh image is received, i.e.

a first mesh and a first texture map is received. The first mesh image represents a scene from a given view point.

The mesh image may be received from any internal or external source. For example, in some embodiments, the mesh image may be received from an external source e.g. via a communication system, or specifically via a network, such as e.g. the Internet. In some embodiments, the mesh image may be received from an internal source being operable to read a suitable distribution medium, for example the mesh image may be extracted from a DVD. In some embodiments, the mesh image may e.g. be extracted from a hard disk or local memory, or indeed in some embodiments the mesh image may be locally generated e.g. by a local virtual reality application.

In many embodiments the first texture map and the first mesh may be generated from a capture of a real life scene. The capture may be by a suitable set of cameras. For example, a single stereo camera or range camera may capture a real life scene and generate an image and a depth (/disparity) map. In other embodiments, a plurality of cameras at different positions may capture a two-dimensional image and a depth map may be generated from the captured images, e.g. by disparity estimation. One of the images may be used as a texture map and a mesh may be generated from the corresponding depth map. Thus, the mesh image may be an image which provides a capture of a real life scene with the texture map representing the light intensity values captured by the camera at the given view point and with the captured depth information being represented by the mesh. Thus, the mesh image provides limited information about the scene as it only represents the information that can be determined from the given view point (as opposed to e.g. a detailed geometric model being available as may be the case for e.g. a local virtual reality engine).

The apparatus further comprises a second receiver 203 which performs step 303 in which it receives a second mesh image, i.e. it receives a second texture map and a second mesh. The second mesh image provides a representation of the same scene but from a different view point. It will be appreciated that the comments provided with respect to the first mesh image apply equally to the second mesh image.

The first receiver 201 and the second receiver 203 are coupled to an image generator 205 which performs step 305 wherein a light intensity image representing the scene from a third view point is generated in response to the first texture map, the first mesh, the second texture map, and the second mesh. Thus, based on the first and second mesh images for respectively a first and second view point, an image is generated for a third view point. The first and second view points may typically be camera view points for the scene with the third view point representing the desired view point. The image is a light intensity image and may specifically correspond to a given viewport and may often be an image that can be presented directly on a display to provide a view of the scene from the third view point. Specifically, the light intensity image may comprise a set of light intensity values with each light intensity value indicating the light intensity at a position of the image. Typically, the image may comprise a set of pixels with each pixel having one or more light intensity values. Thus, each light intensity value may correspond to a pixel value.

It will be appreciated that in some embodiments, each position (pixel) may be associated with/described by/defined by a single light intensity value. This may for example be the case for monochrome images. In other embodiments, each position (pixel) may be associated with/described by/defined by a plurality of light intensity values, such as e.g. one light intensity value for each channel of a color representation. Thus, the light intensity values may be considered color intensity values and the light intensity image may be a color intensity image. In case of a plurality of each pixel being represented by a plurality of light intensity values, such as e.g. corresponding to different color channels, the described approach may e.g. be applied individually to each color channel light intensity value.

The image generator 205 is thus arranged to generate images for different view points. For example, in some embodiments, the image generator 205 may be provided with an input defining a desired view point for example generated in response to a user input. The image generator 205 may then on the basis of the received mesh images generate an output display image corresponding to that view point. This image can then e.g. be rendered by a suitable display.

The operation of the image generator 205 will be described in more detail with reference to FIG. 2 and FIG. 4 which illustrates an example of an approach of the image generator 205.

The image generator 205 comprises a first view transformer 207 which performs step 401 in which first depth values and first image positions in the light intensity image are determined for vertices of the first mesh. Specifically, for each vertex in the first mesh, i.e. the mesh for the first view point, the first view transformer 207 determines a corresponding image position in the light intensity image. This can be considered to correspond to a projection of the first mesh, and specifically the vertices, onto the image plane of the light intensity image, and thus effectively a projection from the first view point to the third view point.

In addition to the determination of the first image positions corresponding to positions in the output image to be generated (the light intensity image), the first view transformer 207 also proceeds to determine first depth values for the vertices. The first depth values may specifically indicate a depth/distance for the vertices from the third view point. Thus, for each first image position/vertex, the first view transformer 207 determines the depth corresponding to that position from the third viewpoint.

The first view transformer 207 is accordingly arranged to warp the mesh from the first view point to the third view point by determining the position in an image from the third view point for each vertex. Further, the depth values for each of these positions/vertices is generated and accordingly an output in the form of a number of points/positions in the third image and associated depths are determined, where each point/position corresponds to a vertex.

The image generator 205 further comprises a second view transformer 209 which performs step 403 in which second depth values and second image positions in the light intensity image are determined for vertices of the second mesh. Specifically, for each vertex in the second mesh, i.e. the mesh for the second view point, the second view transformer 209 determines a corresponding image position in the light intensity image. This can be considered to correspond to a projection of the second mesh, and specifically the vertices, onto the image plane of the light intensity image, and thus effectively a projection from the second view point to the third view point.

In addition to the determination of the second image positions corresponding to positions in the output image to be generated (the light intensity image), the second view transformer 209 also proceeds to determine first depth values for the vertices. The second depth values may specifically indicate a depth/distance for the vertices from the third view point. Thus, for each second image position/vertex, the second view transformer 209 determines the depth corresponding to that position from the third viewpoint.

The second view transformer 209 thus performs the equivalent operation to the first view transformer 207 but on the second mesh rather than the first mesh, and accordingly it is arranged to warp the mesh from the second view point to the third view point by determining the position in an image from the third view point for each vertex in the second mesh. Further, the depth values for each of these positions/vertices is generated and accordingly an output in the form of a number of points/positions in the third image and associated depths are determined where each point/position corresponds to a vertex. It should be noted that the first and second image positions are typically different as they are based on different meshes, different vertices, and different view point shifts.

It will be appreciated that different algorithms and approaches for warping a mesh to determine image positions and depth for a third image are known and that any suitable approach may be used.

In many embodiments, the operation of the first view transformer 207 and the second view transformer 209 are performed by a vertex shader. Vertex shading is a graphics operation which is used in many different graphic applications and a number of algorithms and processes have been developed to perform highly effective and very fast vertex shading. In particular, dedicated hardware and processors for vertex shading have been developed. These approaches utilize high amounts of parallel processing thereby providing very fast processing and allowing real time processing even for very complex scenes and meshes. The first view transformer 207 and second view transformer 209 may specifically be implemented as a vertex shader using dedicated hardware accelerated processing.

Most vertex shading algorithms inherently generate the depth values for the vertices for the output viewpoint as part of the processing determining the image positions. The described functions of the first view transformer 207 and the second view transformer 209 can therefore in many embodiments be implemented by a vertex shader without significant increase in required processing power or complexity.

The approach accordingly allows for a very efficient and often high speed calculation of the image positions and depth values while allowing a high degree of backwards compatibility and reuse of existing functionality, and in particular of dedicated hardware.

The image generator 205 is arranged to perform step 405 wherein the output light intensity image for the third view point is generated from the output of the first view transformer 207 and the second view transformer 209. Step 405 specifically comprises determining a light intensity value for each pixel of the output light intensity image by performing the steps of FIG. 5 for each pixel/position.

The image generator 205 further comprises a first shader 211 which is arranged to determine light intensity values and depth values for a plurality of positions in the output image to be generated, i.e. in the light intensity image for the third viewpoint, from the first image positions and the first texture map, i.e. based on the output generated from the first view transformer 207.

The first shader 211 is specifically arranged to generate a light intensity value and a depth value for each pixel position, and thus for each pixel, for an image from the third view point based on the first image positions and depth values. Thus, the first shader 211 may perform step 501 for each position/pixel of the output light intensity image thereby generating a first intermediate image and a corresponding first intermediate depth map for the third viewpoint from the first mesh image, i.e. from the first mesh and first texture map.

The first shader 211 may specifically use interpolation between the light intensity values and depth values for the points generated by the first view transformer 207.

As an example, a three dimensional triangle of the first mesh may be considered. For the three vertices forming this triangle, the first view transformer 207 determines the corresponding image positions in the first intermediate image and in the first intermediate depth map. Thus, a planar triangle is determined in the first intermediate image corresponding of the projection of the first mesh triangle onto the image plane for the third viewpoint. Each of the three vertices are associated with a position in the first texture map thereby defining the triangle in the texture map that corresponds to the three dimensional triangle in the first mesh. Accordingly, the same triangle in the texture map maps to the determined planar triangle in the first intermediate image, and the first shader 211 may accordingly stretch this texture map triangle over the planar image triangle, for example by interpolation.

Similarly, to determining a planar triangle in the first intermediate image, the first image positions of the three vertices also determine the corresponding planar triangle in the first intermediate depth map. Further, for each vertex, the first view transformer 207 has determined a corresponding depth value and thus depth values are known for the three vertex positions in the first depth map and the first shader 211 may proceed to determine depth values for the different positions, and specific pixels, within the planar triangle, for example by interpolation between the vertex depth values.

The image generator 205 further comprises a second shader 213 which is arranged to perform the corresponding processing on the output from the second view transformer 209. Thus, the second shader 213 may generate second light intensity value based on the second texture map and the second image positions and second depth values based on the second image positions. Thus, the second shader 213 may perform step 503 for each position/pixel of the output light intensity image thereby generating a second intermediate image and a second intermediate depth map for the third view point from the second mesh image, i.e. from the second mesh and the second texture map provided for the second view point.

As a further example, the first shader 211 and second shader 213 may determine the light intensity value by interpolating the texture map values of the vertices of the polygon in which the mesh position falls. The interpolation may be dependent on the distance of the mesh position to the individual vertices.

For example, in the original mesh before transformation, each vertex may have an associated position in the coordinate system based on the current view point (e.g. x, y, z coordinates are defined for each vertex). In addition, each vertex will point to a specific light intensity value/pixel value in the corresponding texture map, i.e. a set of two dimensional texture map coordinates (u,v) are also stored for each vertex.

The view point transformation of the mesh by the first view transformer 207/second view transformer 209 results in a modification of the vertex positions such that the x,y,z values will be transformed to appropriate coordinates in a coordinate system of the third view point. The point on the mesh corresponding to a given first position in the intermediate light intensity image/depth map will be determined, and the vertices of the polygon in which this falls will be identified. The distance from the point to each of the vertices will be determined and for each vertex the light intensity image of the texture map at the u,v position of the vertex is determined. The light intensity value for the first position is then determined by a weighted interpolation of these texture map values with the weights being dependent on the distances to the individual vertex. The same approach is applied to the depth values of the vertices to generate a depth value for the corresponding first position in the intermediate depth map.

In many embodiments, the operations of the first shader 211 and the second shader 213 are performed by a fragment shader. Fragment shading is a graphics operation that is used in many different graphic applications and a number of algorithms and processes have been developed to perform highly effective and very fast fragment shading. In particular, dedicated hardware and processors for fragment shading have been developed. These approaches utilize high amounts of parallel processing thereby providing very fast processing and allowing real time processing even for very complex scenes. The first shader 211 and the second shader 213 may specifically be implemented as a fragment shader using dedicated hardware accelerated processing.

The approach accordingly allows for a very efficient and often high speed generation of full light intensity images and depth maps for a third view point based on mesh images from both a first and a second view point.

Indeed, a particular advantage of the approach is that the generation of the first intermediate image, the second intermediate image, the first intermediate depth map, and the second intermediate depth map can be achieved by performing the same algorithm and functionality. In particular, four fragment shading operations can be applied with each fragment shading implementing the same algorithm, or combined fragment shading generating both light intensity values and depth values can be performed. This is particularly advantageous because the algorithm and operation performed is one that can use existing functionality and especially can use optimized and dedicated hardware. In particular, the algorithm is one that is particularly suited for parallel processing and thus is highly suited for hardware accelerated processing.

It will be appreciated that the different fragment shadings (i.e. for each intermediate image and each depth map) may be performed by separate functionality, and specifically by different hardware fragment shaders operating in parallel, or may e.g. be performed by the same functionality, and specifically by iterations performed by the same hardware fragment shader.

The first shader 211 and the second shader 213 are coupled to a combiner 215 which is arranged to generate an output light intensity image for the third view point by combining the first intermediate light intensity image and the second light intensity image with the combination being based on the depth values of the first intermediate depth map and the second intermediate depth map.

Specifically, for a given position/pixel in the output light intensity image, the combiner 215 may perform step 503 and generate the output light intensity value for that position/pixel as a weighted combination of the light intensity value at the same position in the first intermediate image and the light intensity value at the same position in the second intermediate image where the weights for at least one of the light intensity values is dependent on the depth value at that position in at least one of the first intermediate depth map and the second intermediate depth map.

Further, the combiner 215 is arranged to increase a weighting of the light intensity value in the first intermediate image relative to the weight of the light intensity value in the second intermediate image for an increasing depth value in the first intermediate depth map. Correspondingly, the combiner 215 may be arranged to increase a weighting of the light intensity value in the first intermediate image relative to the weight of the light intensity value in the second intermediate image for a decreasing depth value in the second intermediate depth map.

In many embodiments, the combiner 215 may further be arranged to increase a weighting of the light intensity value in the second intermediate image relative to the weight of the light intensity value in the first intermediate image for an increasing depth value in the second intermediate depth map. Correspondingly, the combiner 215 may be arranged to increase a weighting of the light intensity value in the second intermediate image relative to the weight of the light intensity value in the first intermediate image for a decreasing depth value in the first intermediate depth map.

Thus, the combiner 215 may be arranged to increase the weights for the light intensity value which is further towards the back from the third view point, i.e. which has a higher depth value and distance. Thus, the combiner 215 may bias the combination towards the light intensity value which is further towards the background, and indeed may in some embodiments perform selection combination by selecting the light intensity value furthest to the back.

It should be noted that this approach may be counterintuitive and is the opposite of the conventional approach that selects the light intensity value furthest forward in order to address self-occlusion. However, the Inventor has realized that improved performance can be achieved in many embodiments, when the combination of outputs from fragment shaders such as those of the first shader 211 and the second shader 213 is biased towards the deepest (furthest towards the background) light intensity values.

The Inventor has in particular realized that in some situations, such combining of two images generated for a given viewpoint from surrounding view points by mesh image view point transformation may provide improved de-occlusion performance by increasing the weighting of image objects that tend to not be occluded in the original mesh image. For example, in the specific example of FIG. 1, the approach of FIG. 2 may allow the resulting image to the left of the foreground image to be based more on the input image for view point 1 than view point 2 thereby being increasingly based on an image in which the area is not occluded. The approach has been found to provide a very substantial improvement and in particular to provide substantially improved quality in de-occluded areas.

It will be appreciated that different weighted combinations may be used by the combiner 215 in different embodiments. As a specific example, a weighted linear combination may be used. For example, for each pixel in the output image for the third view point, the following combination of light intensity values $c_n$, where n refers to the view point, may be performed:

$$c_3 = \frac{w_1 c_1 + w_2 c_2}{w_1 + w_2}.$$

The weights in the previous equations depend on the depth values in the generated intermediate depth values:

$$w_1 = f(d_1, d_2), w_2 = f(d_1, d_2)$$

Function $f$ is a typically a monotonically increasing function of the depth value for the depth value for the view point of the weight and/or a monotonically decreasing function of the depth value for the depth value for the other view point. It will be appreciated that in some embodiments, the functions may be different for the different weights and/or have a different dependency on the two depth values, and indeed in some embodiments one or both weights may be dependent on only one of the depth values. Indeed, the change of the relative weight between the first and second view point originating light intensity values may be achieved by changing the first weight, the second weight, or both the first and second weight with each weight being a function of the first depth value, the second depth value, or both the first and second depth values.

In many embodiments, the weighting is dependent on a magnitude of a difference measure between the first depth value and the second depth value. It will be appreciated that any suitable difference measure may be used. In many embodiments, the difference measure may simply be a difference, and thus the weighting may be dependent on a magnitude of a difference measure between the first depth value and the second depth value. In some embodiments, the difference measure may for example be a difference between outputs of monotonic functions applied to the depth values, or a monotonic function of the magnitude of such a difference. The magnitude of the difference measure may be indicative of a degree of difference between the first and second depth values but not indicative of which of these is largest.

In many embodiments, the smaller the magnitude, the smaller the difference between the weights for the first and second light intensity values.

For example, the difference between the weights for the first and second light intensity values may be determined to be a monotonic function of the magnitude of the difference between $d_1$ and $d_2$, such as e.g. a square of the magnitude normalized to be between 0 and 1 for the given depth values. For example, the difference between the weights may be determined as:

$$w_a = \alpha |d_1 - d_2|^2 = \alpha (d_1 - d_2)^2$$

where $\alpha$ is selected to scale $w_a$ to belong to $[0;1]$.

The weights for the first light intensity value and the second light intensity value may depend on the sign of the difference between $d_1$ and $d_2$, and thus may depend on whether $d_1$ and $d_2$, is the largest value (with the largest value being indicative of the pixel being at a higher depth/furthest towards to back). For example, $$w_1 = \tfrac{1}{2}(1 + w_a) \text{ and } w_2 = \tfrac{1}{2}(1 - w_a) \text{ for } d_1 > d_2$$

and $$w_1 = \tfrac{1}{2}(1 - w_a) \text{ and } w_2 = \tfrac{1}{2}(1 + w_a) \text{ for } d_1 \leq d_2$$

As another example, a selection approach may be used:

$$w_1 = 1 \text{ and } w_2 = 0 \text{ for } d_1 > d_2 + \epsilon$$

and $$w_1 = 0 \text{ and } w_2 = 1 \text{ for } d_1 < d_2 + \epsilon$$

and $$w_1 = w_2 = \tfrac{1}{2} \text{ otherwise.}$$

It will be appreciated that many different approaches and equations for determining the weights may be used depending on the preferences and requirements of the individual embodiment. It will also be appreciated that in many embodiments, the weights may be dependent on a sign of a difference between the depth values (and thus on which is the larger/furthest to the back) and on a magnitude of a difference measure with the difference in weighting increasing for an increasing difference measure.

In many embodiments, the weighting for a largest depth value of the first depth value and the second depth value relative to a lowest depth value of the first depth value and the second depth value increases for an increasing magnitude of the difference measure (specifically the difference between the weight for the light intensity value which has the largest depth value and the weight for the light intensity value that has the smallest depth value (of the two depth values) increases the bigger the difference (measure) between the two depth values. The weighting for the light intensity value for the largest depth value is further higher than for the light intensity value for the lowest depth value.

Thus, the combiner 215 may be arranged to increasingly weight the light intensity value furthest to the back, i.e. to bias the generated output light intensity value towards the light intensity value which is furthest to the back. The bias increases the bigger the difference in depth.

Such an approach may in many embodiments provide a very efficient implementation that results in particularly advantageous image generation.

In some embodiments, the combiner 215 may be arranged to perform a selection combining, e.g. by simply selecting the light intensity value that corresponds to the highest depth value. Thus, when generating the output light intensity value for the output light intensity image for the third viewpoint, the combiner 215 may simply set it to the first light intensity value if the first depth value is higher than the second depth value and to the second light intensity value if the second depth value is higher than the first (and to either, or e.g. the average, if they are the same).

As previously described, the operation of the first view transformer 207 and second view transformer 209 may in many embodiments advantageously be performed by a vertex shader and the operation of the first shader 211 and the second shader 213 may be performed by a first fragment shader.

In addition, the operation of the combiner 215, i.e. the combination of the first and second intermediate images may in many embodiments also advantageously be performed by a fragment shader. Specifically, a number of algorithms and processes have been developed to perform highly effective and very fast fragment shading to blend two images together, and many of these may be optimized for hardware acceleration using dedicated hardware. The combiner 215 may specifically be implemented as a fragment shader using dedicated hardware accelerated processing to blend two images.

Indeed, it is a particular advantage of the described approach that the majority of individual operations can be performed using developed graphic processes and dedicated hardware.

In graphic processes, it is sometimes required to represent transparent image objects and elements and a number of algorithms have been developed for this purpose. The Inventor has realized that such functionality may be utilized in the current approach to provide a highly efficient operation and allowing e.g. dedicated hardware and algorithms designed for such transparency processing to be reused for the process of generating new views based on mesh images for other view points.

In some embodiments, the combiner 215 may utilize a fragment shader which implements a fragment shader algorithm where two (or more) texture maps comprising multicomponent values are received and blended together. Specifically, for each uv position/pixel in the texture maps, the algorithm is designed to receive multiple values where one value is a light intensity value and the other value is a transparency component value. Typically, the color of each pixel is represented by three color component values, such as RGB color values, i.e. the texture map is a three color channel texture map. In addition, to the color channels/components, the algorithm is based on the texture maps including a fourth channel, namely a transparency channel providing transparency values, typically denoted by a. The fragment shader algorithm may be arranged to generate an output value for a given position by blending the color channels by combining these on the basis of the transparency value. This may allow a transparent image to be overlaid a background image while allowing the background image to still be seen. The degree of transparency for the individual pixel determines how much of the background and foreground respectively is presented in the output pixel, i.e. it indicates how visible the background is through the (semi)transparent foreground.

In some embodiments, combiner 215 may be arranged to retrieve the depth values from the first shader 211 and the second shader 213 and to generate intermediate multicomponent texture maps where each pixel includes a multicomponent value comprising the light intensity values from the intermediate image and the depth value for the corresponding intermediate depth map. Specifically, the depth value is stored in the channel allocated for transparencies by the fragment shader algorithm. Thus, for a given position/pixel in the output image, the combiner 215 sets a transparency component value of a multicomponent value comprising the intermediate light intensity value to the intermediate depth value for that position. In some embodiments, the intermediate depth value is not included directly but e.g. a monotonic function is applied to generate the value stored in the transparency channel. For example, a normalization may be applied.

Two (or e.g. more) four component/channel intermediate texture maps may thus be generated and the fragment shader algorithm will subsequently be called with these intermediate texture maps. The fragment shader algorithm will treat the depth (derived) values as transparency values and blend the light intensity values (color channel values) based on the depth (derived) values which by the algorithm are assumed to be transparency values.

In this way existing transparency based fragment shaders may be "tricked" into performing a depth based blending as described for the combiner 215. It allows efficient reuse of functionality including dedicated hardware.

A very significant advantage of the described approach is that many of the required operations may in many embodiments be performed by hardware optimized graphics processing. For example, much of the described processing of the two view transformers 207, 209, the two shaders 211, 213, and even the combiner 215 may be performed by a GPU supporting for example the OpenGL standard. This may reduce cost, facilitate design and implementation, and provide a more efficient implementation with typically much increased processing speeds. Further, the approach is based on values that are typically easily available and no dedicated additional processing is required e.g. to generate and warp depth gradients. Rather, often the warping to generate intermediate images inherently generates the required depth values as part of the warping.

As a specific example, a GLSL (OpenGL Shading Language) shader program may be implemented where the depth value of the fragment is written to the fourth element of the variable outputColor:

```
#version 410 core
Uniform sampler2D texture1
in vec2 uvCoordinate
out vec4 outputColor
void main( )
{
   outputColor = texture(texture1, uvCoordinate);
   outputColor[3] = gl_FragCoord.z;
}
```

In the example, an input texture map texture1 and a two component input value uvCoordinate which represents a uv coordinate in the texture map is used to generate a four component output value outputColor for the uv coordinate. The outputColor value is first set to the value of the texture map at the given position, i.e. to texture(texture1, uvCoordinate). This provides an output color value (e.g. the RGB values) for the uv position of uvCoordinate for the specific texture map texture1. In addition, the algorithm sets the fourth component of outputColor, namely outputColor [3], to the value gl_FragCoord.z which is the depth value inherently generated for the uvCoordinate. Normally, the fourth value is used for a transparency value but in the example this value is overwritten by the depth value.

The first view transformer 207 and second view transformer 209 may in this way generate two intermediate texture maps of four component values thereby representing both the intermediate images and depth maps. This may then be blended by the combiner 215 implementing a fragment shader such as the following:

```
#version 410 core
Uniform sampler2D texture1
Uniform sampler2D texture2
in vec2 uvCoordinate
out vec4 outputColor
float gain = 10.0f;
void main( )
{
   vec4 t1 = texture(texture1, uvCoordinate);
   vec4 t2 = texture(texture2, uvCoordinate);
   float d1 = t1.w;
   float d2 = t2.w;
   float delta = d1 − d2;
   float w1 − 0.5f + gain * delta;
   w1 − min( max(w1, 0.0f), 1.0f);
   outputColor = mix(t1, t2, 1.0f − w1);
}
```

In this example, a blended output value is generated for a given uvCoordinate from two textures texture1 and texture2. First, the four component values for the given uv coordinate are assigned to respectively t1 and t2. The depth value components of these are then assigned to d1 and d2. The difference is determined and a weight w1 for the first texture map is determined. The outputColor representing the blended color value is then set by calling the function mix( ) which performs a weighted linear combination of two values based on one weight (the weight for the second texture map is inherently set to 1−w1 by the mixing/ combination operation)). In the example, the depth difference is scaled by a gain (10.0 in this case) which may be adapted to provide the desired bias towards light intensity values further to the back.

The above description has focused on a very efficient approach for generating an output image based on two input mesh images. However, a particularly advantageous feature of the approach is that it in many embodiments may easily be extended to a higher number of input mesh images. For example, the approach may be extended to three mesh images with the same approach being used for the third mesh image to generate the intermediate image and depth map, and the combination be extended to include a weighted combination of three light intensity values based on weights that increase for depth values being increasingly towards the back.

It will be appreciated that different algorithms can be used for determining weights for three (or more) depth values.

For example, in some embodiments, the weighting of the first light intensity value relative to the second light intensity value is dependent on first light intensity values in a first neighborhood around the first light intensity value and second light intensity values in a second neighborhood around the first light intensity value. The first and second neighborhood may specific be in respectively the first and second intermediate images. Thus, the first neighborhood may comprise light intensity values generated from the first mesh image by the first shader 211 and the second neighborhood may comprise light intensity values generated from the second mesh image by the second shader 213.

For example, if the light intensity values in the first neighborhood and in the second neighborhood do not vary much (low variance) the weights may become less dependent (or not dependent at all) on the depth difference. If the variance is for instance below a threshold the weights may become equal. For instance, the weights may become fixed and 0.5 for each of the reference images. The motivation for this is that when both reference images have a uniform texture, there is most likely not a real depth transition or difference and the observed depth difference is due to noise or depth estimation errors.

In many embodiments, the weights of the combination may further be in response to other parameters.

In many embodiments, the weights may further be dependent on the difference between the first view point and the third view point. Specifically, the larger the difference the lower the weight will be. The difference may for example be determined as a geometric difference between x, y, z coordinates between the view points or may e.g. be determined directly from a view point change parameter provided to the image generator 205. The approach may weigh smaller view point transformations higher than larger transformations reflecting the fact that the smaller the change in view point the higher the quality.

Thus, in some embodiments, the weight(s) may also depend on a global parameter that measures how much (e.g. in terms of angular difference) the output view-point (the third view point) differs from the input view point. If this angular difference is large, the weight could be selected to be lower such that nearby cameras have a larger contribution in the blend operation.

In some embodiments, the weighting may be dependent on a reliability indication for the first gradients where the reliability indication is indicative of a reliability of a depth estimation used to determine the depth values, and specifically in determining depth values for the meshes.

Many depth cameras or depth estimation techniques provide a reliability indication which indicates how reliable the generated depth estimate is considered to be. For example, a depth sensor, whether that is a stereo pair or structured light sensor, typically have an associated uncertainty. This uncertainty can come from the disparity estimation process or from the infrared measurement process of the depth sensor. The reliability information may for example be provided as a pixel confidence map. In such a case, pixels with a higher uncertainty may be weighted lower in the combination than pixels with a lower uncertainty. The uncertainty may for example be considered when determining a weight map prior to view point transformation or e.g. the confidence map may be warped to the third view point and considered when determining weights in the third view point domain.

In accordance with some embodiments, the first texture map and the first mesh is generated from a capture of a real-life scene.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method of generating a light intensity image, the method comprising:
   receiving a first texture map and a first mesh, wherein the first mesh represents a scene from a first view point;
   receiving a second texture map and a second mesh, wherein the second mesh represents the scene from a second view point; and
   determining the light intensity image in response to the first texture map the first mesh, the second texture map, and the second mesh,
   wherein the light intensity image represents the scene from a third view point,
   wherein determining the light intensity image comprises:
      determining corresponding first image positions in the light intensity image and first image position depth values for vertices of the first mesh;
      determining corresponding second image positions in the light intensity image and second image position depth values for vertices of the second mesh; and
      for each first position of a plurality of positions in the light intensity image:
         determining a first light intensity value based on the first texture map and the first image positions, and a first depth value based on the first image positions and the first image position depth values;
         determining a second light intensity value based on the second texture map and the second image positions, and a second depth value based on the second image positions and the second image position depth values;
         determining a light intensity value for the light intensity image at the first position as weighted combination of at least the first light intensity value and the second light intensity value;
         wherein a weighting of the first light intensity value relative to the second light intensity value increases for an increasing first depth value.

2. The method of claim 1, wherein the weighting is dependent on a sign of a difference between the first depth value and the second depth value.

3. The method of claim 1,
   wherein the weighting is dependent on a magnitude of a difference,
   wherein the difference is between the first depth value and the second depth value.

4. The method of claim 3, wherein the weighting for a largest depth value of the first depth value and the second depth value relative to a lowest depth value of the first depth value and the second depth value increases for an increasing magnitude of the difference.

5. The method of claim 1, wherein determining the light intensity value for the light intensity image comprises setting the light intensity value to a value of the first light intensity value and the second light intensity value corresponding to a highest depth value.

6. The method of claim 1, wherein determining of corresponding first image positions in the light intensity image and first image position depth values for vertices of the first mesh is performed by a vertex shader.

7. The method of claim 1, wherein the step of determining the first light intensity value is performed by a first fragment shader.

8. The method of claim 1, wherein the determining the light intensity value for the light intensity image is performed by a second fragment shader.

9. The method of claim 8, further comprising, setting a transparency component value of a multicomponent value,
   wherein the multicomponent value comprises the first light intensity value to the first depth value,
   wherein the second fragment shader is arranged to receive second shader texture maps,
   wherein the second shader texture maps comprises the multicomponent value,
   wherein a portion of the multicomponent value comprises at least one light intensity component value and one transparency component value,
   wherein the second fragment shader is arranged to generate an output light intensity value by combining light intensity component values from a plurality of the texture maps in response to the transparency component value.

10. The method of claim 1,
    wherein the weighted combination comprises a third light intensity value,
    wherein the third light intensity value is generated from a third mesh and a third texture map.

11. The method of claim 1, wherein the weighting of the first light intensity value relative to the second light intensity value is dependent on first light intensity values in a first neighborhood around the first light intensity value and second light intensity values in a second neighborhood around the second light intensity value.

12. The method of claim 1, wherein the weighting is dependent on a difference between the first view point and the third view point.

13. The method of claim 1,
    wherein the weighting of the first light intensity value relative to the second light intensity value is dependent on a reliability indication,
    wherein the reliability indication is indicative of a reliability of a depth estimation,
    wherein the depth estimation is used to determine a depth at the first mesh position in the first image position depth values,
    wherein the weighting of the first light intensity value relative to the second light intensity value increasing for the reliability indication is indicative of an increasing reliability of the depth estimation.

14. An apparatus comprising:
    a first receiver,
       wherein the first receiver is arranged to receive a first texture map and a first mesh,
       wherein the first mesh represents a scene from a first view point;
    a second receiver,
       wherein the second receiver is arranged to receive a second texture map and a second mesh,
       wherein the second mesh represents the scene from a second view point;
    an image generator,
       wherein the image generator is arranged to determine a light intensity image representing the scene from a third view point in response to the first texture map, the first mesh, the second texture map, and the second mesh wherein the image generator comprises:
- a first view transformer,
  - wherein the first view transformer is arranged to determine corresponding first image positions in the light intensity image and first image position depth values for vertices of the first mesh;
- a second view transformer,
  - wherein the second view transformer is arranged to determine corresponding second image positions in the light intensity image and second image position depth values for vertices of the second mesh;
- a first shader,
  - wherein the first shader is arranged to determine, for each first position of a plurality of positions in the light intensity image, a first light intensity value based on the first texture map and the first image positions, and a first depth value based on the first image positions and the first image position depth values;
- a second shader,
  - wherein the second shader is arranged to determine, for each first position of the plurality of positions in the light intensity image, a second light intensity value based on the second texture map and the second image positions, and a second depth value based on the second image positions and the second image position depth values;
- a combiner,
  - wherein the combiner is arranged to determine, for each first position of the plurality of positions in the light intensity image, a light intensity value for the light intensity image at the first position as weighted combination of at least the first light intensity value and the second light intensity value;
  - wherein a weighting of the first light intensity value relative to the second light intensity value increases for an increasing first depth value.

15. The apparatus of claim 14, wherein the weighting is dependent on a sign of a difference between the first depth value and the second depth value.

16. The apparatus of claim 14,
wherein the weighting is dependent on a magnitude of a difference,
wherein the difference is between the first depth value and the second depth value.

17. The apparatus of claim 16, wherein the weighting for a largest depth value of the first depth value and the second depth value relative to a lowest depth value of the first depth value and the second depth value increases for an increasing magnitude of the difference.

18. The apparatus of claim 14, wherein determining the light intensity value for the light intensity image comprises setting the light intensity value to a value of the first light intensity value and the second light intensity value corresponding to a highest depth value.

19. The apparatus of claim 14,
wherein the weighted combination comprises a third light intensity value,
wherein the third light intensity value is generated from a third mesh and a third texture map.

20. A computer program stored on a non-transitory medium, wherein the computer program when executed on a processor performs the method as claimed in claim 1.

* * * * *